(12) United States Patent
Rhee et al.

(10) Patent No.: US 10,824,373 B2
(45) Date of Patent: Nov. 3, 2020

(54) EFFECTIVE QUANTUM RAM ARCHITECTURE FOR QUANTUM DATABASE

(71) Applicant: Korea Advanced Institute of Science and Technology, Daejeon (KR)

(72) Inventors: June-Koo Rhee, Daejeon (KR); Kyungdeock Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/412,692

(22) Filed: May 15, 2019

(65) Prior Publication Data

US 2019/0354316 A1  Nov. 21, 2019

(30) Foreign Application Priority Data

May 17, 2018 (KR) .................. 10-2018-0056581

(51) Int. Cl.
*G06N 10/00* (2019.01)
*B82Y 10/00* (2011.01)
(Continued)

(52) U.S. Cl.
CPC .......... *G06F 3/0659* (2013.01); *G06F 3/0604* (2013.01); *G06F 3/0673* (2013.01);
(Continued)

(58) Field of Classification Search
CPC ...... G06F 3/0659; G06F 16/22; G06F 16/245; G06F 3/0604; G06F 3/0673; G06N 10/00
(Continued)

(56) References Cited

U.S. PATENT DOCUMENTS 6,456,994 B1 * 9/2002 Tucci .................. B82Y 10/00
706/52
7,383,235 B1 * 6/2008 Ulyanov .............. B82Y 10/00
706/13
(Continued)

FOREIGN PATENT DOCUMENTS

JP          2010218513 A      9/2010
JP          2011197875 A      10/2011
(Continued)

OTHER PUBLICATIONS

Arunachalam et al., "On the robustness of bucket brigade quantum RAM", New Journal of Physics, 2015, 16 pages, vol. 17, No. 12.
(Continued)

*Primary Examiner* — Ly D Pham
(74) *Attorney, Agent, or Firm* — The Webb Law Firm

(57) ABSTRACT

The present invention relates to the architecture of a quantum RAM, a method for using classical data in quantum computing by inputting the classical data as quantum data, and a system and method of operating a quantum database using the architecture. Quantum computing can achieve an exponential speed-up in some applications using a large parallel process provided by a quantum database in which information can be superposed. The present invention proposes an efficient quantum database architecture and protocol that can record and search for classical information with a quantum circuit.

9 Claims, 3 Drawing Sheets

(51) Int. Cl.
*G06F 3/06* (2006.01)
*G06F 16/22* (2019.01)
*G06F 16/245* (2019.01)
*G06N 7/00* (2006.01)

(52) U.S. Cl.
CPC ............ *G06F 16/22* (2019.01); *G06F 16/245* (2019.01); *G06N 10/00* (2019.01); *B82Y 10/00* (2013.01); *G06N 7/005* (2013.01)

(58) Field of Classification Search
USPC ........................................................ 706/15
See application file for complete search history.

(56) References Cited

U.S. PATENT DOCUMENTS

| | | | | |
|---|---|---|---|---|
| 2004/0024750 | A1* | 2/2004 | Ulyanov | G06N 10/00 |
| 2004/0078421 | A1* | 4/2004 | Routt | H04L 9/0852 |
| | | | | 709/201 |
| 2004/0130956 | A1* | 7/2004 | Porto | B82Y 10/00 |
| | | | | 365/200 |
| 2004/0162640 | A1* | 8/2004 | Branciforte | G06N 10/00 |
| | | | | 700/262 |
| 2006/0224547 | A1* | 10/2006 | Ulyanov | G06N 10/00 |
| | | | | 706/62 |
| 2007/0215862 | A1* | 9/2007 | Beausoleil | B82Y 10/00 |
| | | | | 257/31 |
| 2016/0328253 | A1* | 11/2016 | Majumdar | G06F 9/45504 |
| 2018/0150760 | A1* | 5/2018 | Sarpeshkar | G06F 7/48 |
| 2019/0244128 | A1 | 8/2019 | Choi et al. | |
| 2019/0354316 | A1 | 11/2019 | Rhee et al. | |

FOREIGN PATENT DOCUMENTS

| | | |
|---|---|---|
| KR | 1020180043157 A | 4/2018 |
| KR | 1020190041887 A | 4/2019 |
| KR | 1020190131771 A | 11/2019 |

OTHER PUBLICATIONS

Chung et al., "The Present and Perspective of Quantum Machine Learning", Journal of KIISE, 2016, pp. 751-762, vol. 43, No. 7.

* cited by examiner

EFFECTIVE QUANTUM RAM ARCHITECTURE FOR QUANTUM DATABASE

CROSS-REFERENCE TO RELATED APPLICATION

This application claims priority to Korean Patent Application No. 10-2018-0056581 filed on May 17, 2018, the disclosure of which is hereby incorporated by reference in its entirety.

BACKGROUND OF THE INVENTION

Field of the Invention

The present invention relates to the architecture of a quantum RAM, a method for using classical data for quantum computing by inputting the classical data as quantum data, and a system and method of operating a quantum database using the architecture and method.

Description of the Related Art

Quantum computing technology is being developed as an efficient way to find answers to difficult problems that require large computations. Quantum RAM (QRAM) is required to provide input data for quantum computing, but the effective and efficient architecture and method of implementation are not well developed. In particular, the quantum RAM can achieve speed-ups of a quantum computer by recording large classical data and providing a quantum computer with the data in quantum superposition. There is a need for effectively recording and superposing classical data using the quantum RAM.

In the prior art, the device complexity is O(N log N) when the classical information capacity (hereinafter referred to as information capacity) of the QRAM is N, in order to record superposed data on the QRAM in a Flip-Flop QRAM.

BRIEF SUMMARY OF THE INVENTION

Quantum computing can be implemented with complexity of O(log N) or polynomial complexity of log N, using the fact that speed can be exponentially improved in some applications using a large parallel process provided by a quantum database by which information can be superposed. An object of the present invention is to provide systems such as a quantum RAM and quantum database, and a method thereof being able to effectively record classical information in accordance with the superposition state of bus qubits arbitrarily provided when classical data are to be loaded as quantum data using an existing Flip-Flop QRAM.

First, to sum up the characteristics of the present invention, a quantum circuit of a quantum RAM for producing quantum database according to an aspect of the present invention includes a quantum memory for storing data through a quantum process and providing a search result for a quantum query. The above quantum RAM includes a bus qubit corresponding to each bit of first input data, a first controlled-bit-flip gate performing controlled-bit-flip transform between the bus qubit and each bit of the first input data, a register qubit given to encode the first input data into a probability amplitude value, a controlled rotation gate for probability amplitude adjustment of a quantum superposition state given as a tensor product of a bus qubit state and a register qubit state for output of the first controlled-bit-flip gate, and a second controlled-bit-flip gate performing controlled-bit-flip transform between a part corresponding a bus qubit of output of the controlled rotation gate and each bit of the first input data.

A predetermined quantum superposition state corresponding to a plurality of queries as input of the bus qubit may be received to produce a quantum database for the quantum superposition state.

The quantum RAM, in order to calculate data in a quantum superposition state with second input data superposed on the first input data, may further include: a third controlled-bit-flip gate performing controlled-bit-flip transform between output of the second controlled-bit-flip gate and each bit of the second input data; a second controlled rotation gate for probability amplitude adjustment of a quantum superposition state given as a tensor product of a bus qubit state and a register qubit state for output of the third controlled-bit-flip gate; and a fourth controlled-bit-flip gate performing controlled-bit-flip transform between a part corresponding to a bus qubit of output of the second controlled rotation gate and each bit of the second input data.

The controlled rotation gate includes a single qubit unitary gate conditionally adjusting the state of the register qubit corresponding to a target qubit of a tensor product state having all control qubits in $|1\rangle$ state.

The single qubit unitary gate may be a rotation gate rotated by a predetermined angle about a predetermined axis on the Bloch sphere.

The controlled rotation gate may perform rotation corresponding to complex probability amplitude information on the Bloch sphere.

The quantum computing circuit may further include a gate to which rotation computing is applied before or after the first controlled-bit-flip gate and the second controlled-bit-flip gate, and thus, may process input of the first input data and a normalized generation frequency (or normalized occurrence of data).

For the quantum computing circuit, two or more register qubits in a $|0\rangle$ state may be used other than bus qubits from 0 to n−1 corresponding to bits of the first input data to independently compute two or more sets of data, and a first computing architecture including the first controlled-bit-flip gate, the controlled rotation gate, and the second controlled-bit-flip gate, and at least one computing architectures arranged in series in the same architecture as the first computing architecture may perform the probability amplitude adjustment using multiple register qubits in the controlled rotation gate, respectively, thereby processing independently separate computation for input data of the computing architectures.

A quantum computing circuit of a quantum RAM for producing a quantum database according to another aspect of the present invention includes a quantum RAM for storing data through a quantum process and providing a search result for a quantum query. The quantum RAM may include a bus qubit corresponding to each bit of first input data, a first controlled-bit-flip gate performing controlled-bit-flip transform between the bus qubit and each bit of the first input data, a register qubit given to encode the first input data into a probability amplitude value, a first controlled rotation gate for probability amplitude adjustment of a quantum superposition state given by a tensor product of a bus qubit state and a register qubit state for output of the first controlled-bit-flip gate, a second controlled rotation gate for probability amplitude adjustment of a quantum superposition state given as tensor product of a bus qubit state and a register qubit state for output of the first controlled rotation gate, and a second controlled-bit-flip gate performing controlled-bit-flip transform between a part corresponding a bus qubit of output of the second controlled rotation gate and each bit of second input data.

A quantum database should register data in a way of superposing multiple data input of a qubit of O(log N). A system and method including a quantum computing circuit of a quantum RAM for producing quantum database using quantum superposition according to the present invention can provide new and efficient quantum RAM and quantum database having a protocol about how to express quantum information that can be applied to quantum processing for the data computing.

BRIEF DESCRIPTION OF THE DRAWINGS

Accompanying drawings included as a part of the detailed description for helping the understanding of the present invention provide embodiments of the present invention and detailed description of the present invention.

DETAILED DESCRIPTION OF THE INVENTION

Figure 1:
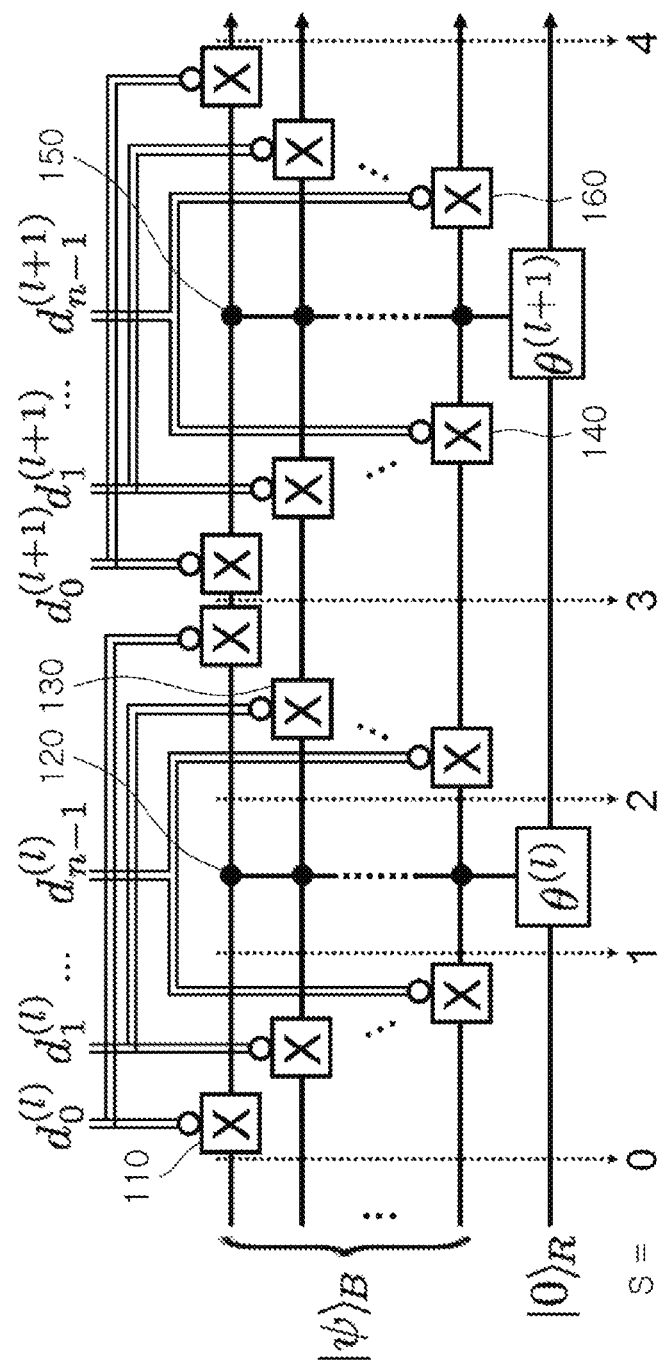
FIG. 1 is a block diagram of a quantum computing circuit architecture for configuring a quantum RAM (QRAM) for registering a predetermined quantum database of the present invention.

Hereinafter, the present disclosure will be described in detail with reference to the accompanying drawings. Here, throughout the accompanying drawings, the same components will be denoted by the same reference numerals. In addition, a detail description for functions and/or configurations that have been well-known will be omitted. In the following specification, portions required for understanding operations according to various exemplary embodiments will be mainly described, and a description for components that may obscure the gist of the present disclosure will be omitted. In addition, some components in the accompanying drawings may be exaggerated, omitted, or schematically shown. Sizes of the respective components do not reflect actual sizes of the respective components. Therefore, contents mentioned herein are not limited by relative sizes of or intervals between components shown in the accompanying drawings In describing the present invention, when a detailed description of well-known technology relating to the present invention may unnecessarily make unclear the main idea of the present invention, the description thereof will be omitted. Further, the following terminologies are defined in consideration of the functions in the present disclosure and may be construed in different ways by the intention or practice of users and operators. Therefore, the definitions thereof should be construed based on the contents throughout the specification. Terms that are used in the following description are provided only to describe embodiments of the present invention without limiting the present invention. Unless clearly used otherwise, a singular term includes meaning of a plural. In this specification, terms such as "including" or "having" mean specific characteristics, numbers, steps, operations, components, some or a combination thereof, and should not be construed as excluding existence or possibility of one or more characteristics, numbers, steps, operations, components, some or a combination thereof other than them described above.

Terms such as "first" and "second" can be used to describe various components, but the components are not limited by the terms and are used only discriminating one component from another component.

First, quantum computing can speed-up by use of quantum superposition of information that allows massive parallel processes, with overall cost of O(log N) in some applications. In order to attain such gain, there must be a quantum database that provides superposed information of a large classical database. For example, the related art that is in association with learning parity with noise inspires that such database can be achieved with simple and systematic architecture of quantum circuits.

The present invention proposes a new class of quantum database (QDB) architecture and protocol that is equivalent to quantum random access memory (QRAM) with an application of classical information. This QDB model can be also a good model for classical-to-quantum interface (CQI) and quantum-to-classical interface (QCI).

Such a quantum database can be implemented using a QRAM. However, although a QRAM model requiring a qubit of O(log N) has been proposed in the related art, it is not suitable because due to cost requirement of O(log N) for classical circuits to control all possible quantum states. If applications of a QRAM are exclusively limited to write and read classical data, a very general QRAM architecture in which a quantum circuit cost is O(log N) similar to classical methods can be derived.

QRAM design for a QDB is addressed in the description of the present invention to obtain a quantum database for reading, writing, and handling classical information with a quantum computing circuit.

The QDB is configured to be produced using a QRAM, the QRAM understood as a computation register, in which, for example, the data may be modified and updated as a result of computation. The QDB can register and store classical data on the QRAM as quantum superposition and can also register and store a quantum process for a query. The QDB can store, register, correct, delete, and edit data in response to queries on the basis of data and query processes stored and registered in this way.

A classical query can be taken by only one at a time, while a quantum query can be taken at a time as quantum superposition through a multiple quantum query type. As a result of quantum process to find search result for the query, the QRAM state may be modified to represent the result of query. The result can be read out by a suitable quantum measurements before final revert process. It is desirable to design the read-out measurement in a way that the measurement may not change the quantum data in the QRAM. In this way, the QRAM of the QDB can be reverted by inversion of the quantum process to restore all the initial quantum data.

In general, a quantum state $|\psi\rangle_{QBD}$ of a quantum database QDB in which classical data are encoded in a quantum state may be expressed as in [Equation 1].

$$|\psi\rangle_{QBD} = \sum_{l=0}^{M-1} b_l |\vec{d}^{(l)}\rangle, |\vec{d}^{(l)}\rangle = |\vec{x}^{(l)}\rangle |l\rangle \quad \text{[Equation 1]}$$

In the above equation, $|\vec{d}^{(l)}\rangle$ means mapping digitized classical data into a computational basis state of n qubit, and $|\vec{x}^{(l)}\rangle$ and $|l\rangle$ (l<M) (M is a natural number) mean a data entry and label, respectively. $b_l$ mapped to a probability amplitude of a quantum state denotes the frequency number of a normalized data entry. When the width of a data entry bit string is n (n is a natural number) and the total number of data is $M \leq 2^m$ (m is 0 or a natural number), the quantum database in [Equation 1] may be implemented using an n+m qubit. When all data entries have eigenvalues (unique), m is 0 and a label does not need to be used.

The quantum state of the quantum database may be made through a bus qubit in which the computational basis states of the n+m qubit are in a predetermined superposition state, and a QRAM process QRAM(D) in [Equation 2]. That is, it is possible to process a corresponding quantum query in order to receive a predetermined quantum superposition state corresponding to a plurality of queries as input of the bus qubit and produce a quantum database for the quantum superposition state.

$$QRAM(D) \sum_j \psi_j |\vec{j}\rangle_b |0\rangle_d = \sum_{\vec{j} \in \{\vec{d}^{(l)}\}} \psi_j |\vec{j}\rangle_b |d_j\rangle_d \quad \text{[Equation 2]}$$

In the above equation, $|\vec{j}\rangle_b$ is a computational basis constituting the bus qubit and the probability of accessing each j-th basis is determined by $\psi_j$. $|d_j\rangle_d$ has a data entry corresponding to the basis state of a bus qubit and a probability amplitude value (data frequency number) of the data entry in the classical data $D=\{\vec{d}^{(l)}, b_l | 0 \leq l < M\}$. m=0 is assumed in the following examples including FIG. 1 for the convenience.

A quantum process for constructing the quantum database includes a fundamental quantum unitary computation. A QRAM model can be configured using a classically-controlled-bit-flip X and controlled rotation gates (CR, controlled rotations) for controlled probability amplitude adjustment. A Hadamard H gate is a single qubit unitary operator, given as [Equation 3].

The classically-controlled-bit-flip X is also a single qubit unitary computation controlled by a classical control input bit d. A classically-controlled-bit-flip $X_{NC}$ (110, 130, 140, 160) for negated control (d=0) is used, as in [Equation 3], in the present invention.

$$X_{NC}: \alpha|0\rangle + \beta|1\rangle \rightarrow \begin{cases} \beta|0\rangle + \alpha|1\rangle, & \text{for } d = 0 \\ \alpha|0\rangle + \beta|1\rangle, & \text{for } d = 1 \end{cases} \quad \text{[Equation 3]}$$

where the Dirac ket vector $|0\rangle(|1\rangle)$ denotes the quantum state of a qubit corresponding to 0(1), and complex numbers α and β denote the quantum probability amplitudes, such that $|\alpha|^2 + |\beta|^2 = 1$. With this qubit definition, the quantum information space of a qubit becomes a Hilbert space.

Two or more qubits may produce a multi-dimensional Hilbert space as a tensor product space.

For example, a two-qubit state may hold the quantum state information, $|\psi\rangle \equiv |\psi\rangle_0 |\psi\rangle_1 = q_{00}|00\rangle + q_{01}|01\rangle + q_{10}|10\rangle + q_{11}|11\rangle$, $\Sigma_{\vec{b} \in \{0,1\}^{\otimes 2}} |q_{\vec{b}}|^2 = 1$.

A controlled rotation gate, that is, a controlled rotation (CR) is, in general, a multi-qubit unitary operator, which makes a superposition state having a non-uniform probability amplitude by rotating a resister qubit in which all qubits are coupled to a qubit that is in a $|1\rangle$ state on the Bloch sphere. The sign of a tensor product state is changed into an inverse sign. For example, rotation gate ($CR_y(\theta)$) computation of two-qubit controlled $R_y(\theta)$ in which rotation is performed by an angle θ about y-axis on the Bloch sphere is as in [Equation 4]. That is, the following controlled rotation gates are single qubit unitary gates optionally adjusting the state of a register qubit corresponding to a target qubit of a tensor product state having all control qubits that are in the $|1\rangle$ state. The single qubit unitary gates may be rotated by a predetermined angle about a predetermined axis on the Bloch sphere.

$$CR_y(\theta): q_{00}|00\rangle + q_{01}|01\rangle + q_{10}|10\rangle + q_{11}|11\rangle \rightarrow q_{00}|00\rangle + q_{01}|01\rangle + q_{10}|1\rangle(\cos(\theta/2)|0\rangle + \sin(\theta/2)|1\rangle) + q_{11}|1\rangle(-\sin(\theta/2)|0\rangle + \cos(\theta/2)|1\rangle) \quad \text{[Equation 4]}$$

A controlled rotation gate that rotates the register qubit by θ about a p-axis on the basis of the tensor product state of the n qubit is expressed as $C^n R_p(\theta)$. FIG. 1 is a block diagram of the architecture of a quantum computing circuit for configuring a QRAM (device or system) having a controlled $R_y(\theta)$-rotation gate $C^n R_y(\theta)$ in the present invention. A method of inputting class information and quantum superposition on a QRAM is described on the basis of FIG. 1. An efficient architecture design of a QRAM model utilizing the controlled $R_y(\theta)$-rotation gate $C^n R_y(\theta)$ is proposed in FIG. 1, which also describes how to write and superpose classical data $\vec{d}^{(i)}$ and $\vec{d}^{(i+1)}$. Here, the bit sequences follow a big-endian convention. To begin a QRAM computation for n qubit information, an n qubit bus state (or a bus qubit) $|\psi\rangle_B = \Sigma_j \psi_j |\vec{j}\rangle_b$ described in [Equation 2] is prepared. As described above, m=0 was assumed. The state of (n+1) qubits composed of a bus qubit and a register qubit before the QRAM process is started may be expressed as [Equation 5]. The bus qubit includes states corresponding to each bit of input data and the register qubit includes states given to encode input data into probability amplitude values.

$$|\psi_0\rangle_l = \psi_{d^{(l)}} |\vec{d}^{(l)}\rangle |0\rangle_R + \sum_{\vec{j} \neq \vec{d}^{(l)}} \psi_j |\vec{j}\rangle |0\rangle_R \quad \text{[Equation 5]}$$

In the above equation, $|\psi_s\rangle_l$ means the (n+1) qubit state including a bus qubit and a register qubit corresponding to each bit of data values in the s-th (s=0) step in the process of inputting the l-th data value shown in FIG. 1, and $|\cdot\rangle_R$ is the state of the register qubit. When transform by a controlled-bit-flip-gate $X_{NC}$ 110 between the bus qubit and each bit of the first input data is performed, the state of [Equation 6] is output.

$$|\psi_1\rangle_l = \psi_{d^{(l)}} |1\rangle^{\otimes n} |0\rangle_R + \sum_{|\vec{j} \oplus \vec{d}^{(l)}\rangle \neq |1\rangle^{\otimes n}} \psi_j |\vec{j} \oplus \vec{d}^{(l)}\rangle |0\rangle_R \quad \text{[Equation 6]}$$

In the above equation, $\vec{j}$ means a string in which each bit of the bit string j is bit-flipped. By inputting the output state into a controlled rotation gate $C^n R_y(2\theta^{(l)})$ 120 rotating a register qubit by $2\theta^{(l)}$ about the y-axis on the basis of when bus qubit states are all 1, output of [Equation 7] is obtained. That is, the controlled rotation gate 120 adjusts the probability amplitude of a quantum superposition state given as a tensor product of a bus qubit state and a register qubit state for the output of the controlled-bit-flip-gate 110.

$$|\psi_2\rangle_l = \psi_{d^{(l)}}|1\rangle^{\otimes n}|\theta^{(l)}\rangle_R + \sum_{|\vec{j}\oplus\vec{d}^{(l)}\rangle \neq |1\rangle^{\otimes n}} \psi_j|\vec{j}\oplus\vec{d}^{(l)}\rangle|0\rangle_R \qquad [\text{Equation 7}]$$

In the above equation, $|\theta^{(l)}\rangle_R = \cos(\theta)|0\rangle_R + \sin(\theta)|1\rangle_R$ and $\theta^{(l)}$ is determined by target data $b_l = \psi_{d^{(l)}} \sin \theta^{(l)}$. When the transform by a controlled-bit-flip-gate $X_{NC}$ 130 between the bus qubit and each bit of the first input data ($\vec{d}^{(l)}, \theta^{(l)}$) is performed again, the state of [Equation 8] is output. That is, controlled-bit-flip-gate $X_{NC}$ 130 performs controlled-bit-flip transform between the part corresponding to a bus qubit of the output of the controlled rotation gate 120 and each bit of the first input data.

$$|\psi_3\rangle_l = \psi_{d^{(l)}}|\vec{d}^{(l)}\rangle|\theta^{(l)}\rangle_R + \sum_{\vec{j}\neq \vec{d}^{(l)}} \psi_j|\vec{j}\rangle|0\rangle_R \qquad [\text{Equation 8}]$$

In the above output state, the state of [Equation 9] may be obtained by repeating the processes from [Equation 6] to [Equation 8] for a new l+1-th second data ($\vec{d}^{(l+1)}, \theta^{(l+1)}$) using controlled-bit-flip gate $X_{NC}$ 140 and 160 and a controlled rotation gate $C^nR_y(2\theta^{(l+1)})$ 150.

$$|\psi_4\rangle_{l,l+1} = \psi_{d^{(l)}}|\vec{d}^{(l)}\rangle|\theta^{(l)}\rangle_R +$$
$$\psi_{d^{(l+1)}}|\vec{d}^{(l+1)}\rangle|\theta^{(l+1)}\rangle_R + \sum_{\vec{j}\neq \vec{d}^{(l)},\vec{d}^{(l+1)}} \psi_j|\vec{j}\rangle|0\rangle_R \qquad [\text{Equation 9}]$$

This process may be repeated by the number of data entries, and when the same data entry is repeatedly input, a rotational amount is corresponding-accumulated and reflected to $b_l$ that is a probability amplitude amount. It is possible to achieve the state of [Equation 10] by inputting M data entries in this way.

$$|\psi\rangle = \sum_{l=0}^{M-1} b_l|\vec{d}^{(l)}\rangle|1\rangle_R + \sum_{l=0}^{M-1} a_l|\vec{d}^{(l)}\rangle|0\rangle_R + \sum_{\vec{j}\notin \vec{d}^{(l)}} \psi_j|\vec{j}\rangle|0\rangle_R \qquad [\text{Equation 10}]$$

In this above equation, $a_l = \sqrt{1 - |b_l|^2}$.

Finally, when an output value that is 1 by measuring a register qubit through a computational basis in the state of [Equation 10] is post-selected, the bus qubit becomes the quantum database state defined in [Equation 1].

Consequently, such a QRAM model may resister $2^n$ data by quantum superposition that can be simultaneously processed in parallel by quantum computing such as quantum Fourier transform.

When a bit flip gate operation is generated continuously two times in a second controlled-bit-flip-gate $X_{NC}$ that is used for registering the first data and a first controlled-bit-flip-gate $X_{NC}$ that is used for registering the second data in order to sequentially register a plurality of items of classical information, two operations of corresponding gates 130 and 140 both may be simultaneously omitted. This principle may be similarly applied to similar parts of even other gates.

By including a controlled rotation gate to which rotation computation is applied before or after the first controlled-bit-flip-gate 110 and the second controlled-bit-flip-gate 130, it is possible to process input of first input data and a normalized generation frequency (or normalized occurrence of data).

Classical data having a non-uniform weight expressed on the basis of a tensor product may be superposed in complex probability amplitude. In order to give a complex probability amplitude, a gate rotating about another axis may be used rather than the controlled $R_y(\theta)$-gate $C^nR_y(\theta)$) rotation. For example, by using $R_z(\theta)R_x(180)R_z(-\theta)$ (x, y and z axes are right angles to each other) instead of $R_y(\theta)$, it is possible to encode $e^{i\theta}$-type complex data with a probability amplitude. That is, a controlled rotation gate that performs rotation corresponding to complex probability amplitude information on the Bloch sphere may be used.

As a general exemplary application of the proposed technique, it is possible to consider how a QDB can be used in a quantum support vector machine (QSVM). A QDB for supervised machine learning may be given as superposed learning data $|x\rangle$ composed of input data vectors $\vec{x}^{(i)}$ having a label i, as in [Equation 11].

$$|x\rangle = \frac{1}{\sqrt{\sum_{i=0}^{M-1}|\vec{x}^{(i)}|^2}} \sum_{i=0}^{M-1}\sum_{k=0}^{N-1} x_k^{(i)}|k\rangle|i\rangle \qquad [\text{Equation 11}]$$

where M denotes the number (natural number) of training data samples and N is the (i) number (natural number) of basic vectors showing $\vec{x}_k^{(i)}$.

Figure 2:
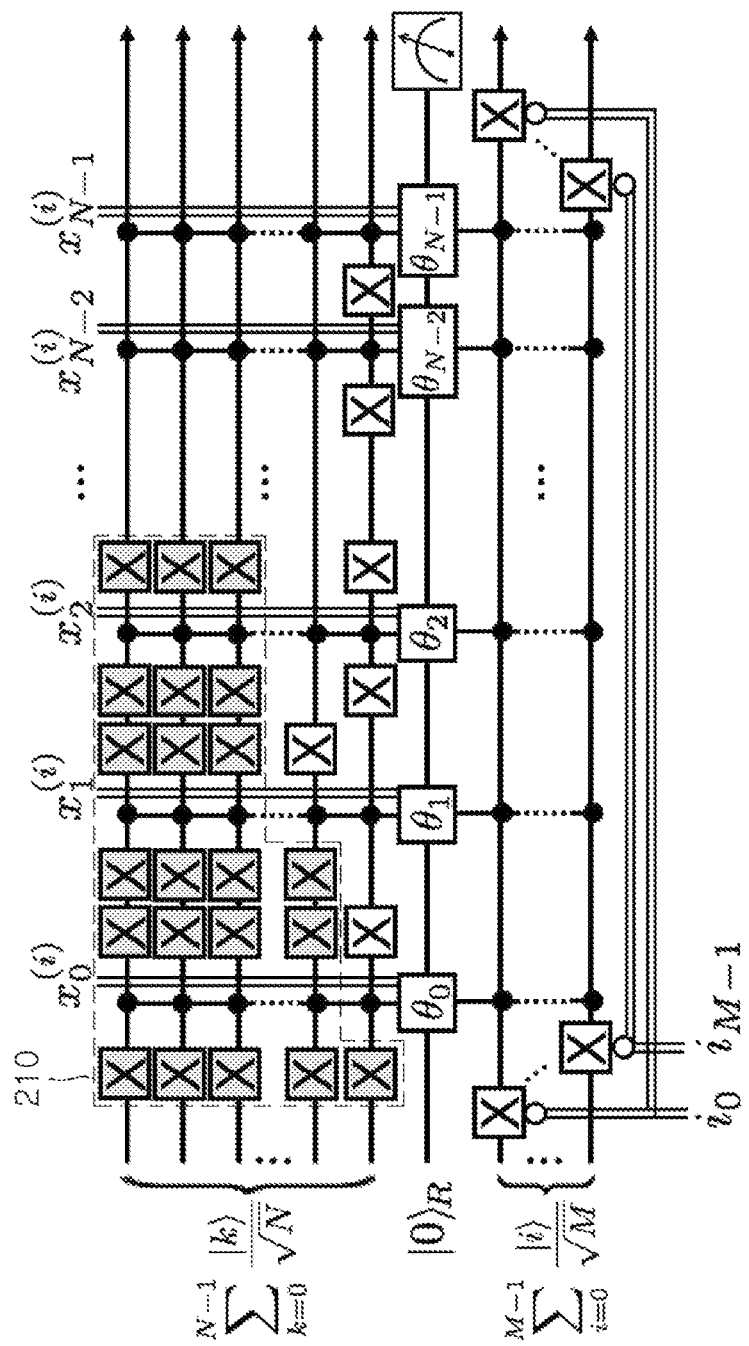
FIG. 2 shows a quantum input state required for quantum supervised machine learning, that is, an embedding model of a quantum database (QDB) as a practical example of the present invention.

An embedding model of the QDB is proposed in FIG. 2. Bit-flip-computation 210 indicated by gray in FIG. 2 is omitted when an actual quantum circuit is implemented, but are left to help understanding. In order to obtain a specific state corresponding to [Equation 11], the QDB may be used with post-selection that selects 1 as a register qubit measurement. Like FIG. 2, quantum computing for i for a data label may be performed simultaneously with quantum data superposition described above and may be correspondingly registered and stored.

Figure 3:
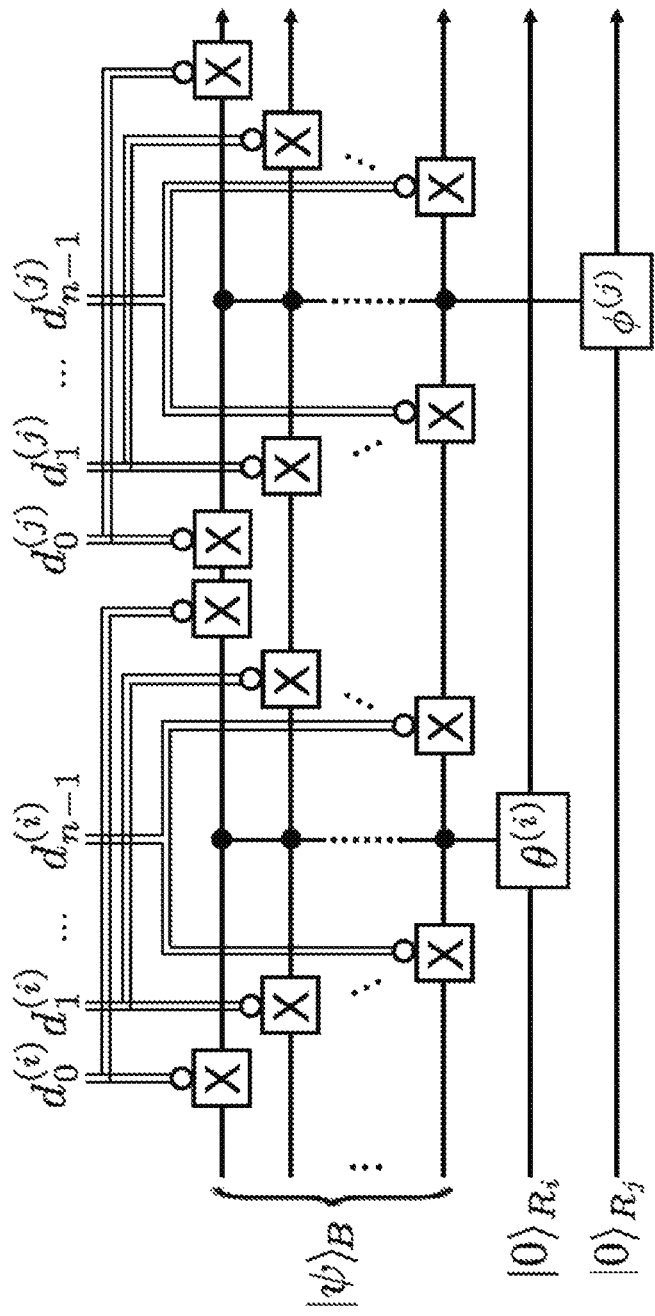
FIG. 3 is a diagram illustrating a method for processing two independent sets of data in accordance with another embodiment of the present invention.

The QRAM described above may process computing such as storing, registering, modifying, and deleting separately for each of a plurality of sets of data. FIG. 3 is a method of registering two independent sets of data, in which independent separate computation may be performed on data registered through an n-th qubit when computation that neglects an n+1-th qubit is performed, and vice versa. Expansion is possible by this method to register two or more sets of data.

For example, in order to independently compute two or more sets of data $\vec{d}^{(i)}$ and $\vec{d}^{(j)}$, as shown in FIG. 3, two or more register qubits (only two register qubits are shown in FIG. 3) in a $|0\rangle$ state other than a bus qubit corresponding to the bit of input data may be used. This is an architecture in which an n+1-th $|0\rangle$ qubit is added in the architecture of FIG. 1 and a first computing architecture including a first controlled-bit-flip gate, a controlled rotation gate, and a second controlled-bit-flip gate, and at least one computing architectures arranged in series in the same architecture as the first computing architecture perform probability amplitude adjustment using register qubits in corresponding controlled rotation gates, respectively. Accordingly, separate computation may be independently processed for input data $\vec{d}^{(i)}$ and $\vec{d}^{(j)}$ of the computing architectures.

As described above, a QRAM using quantum superposition according to the present invention and a QDB using the QRAM may provide new and efficient quantum RAM and quantum database that register data in a way of superposing multiple data input to a qubit of O(log N) and have a protocol about how to express quantum information that can be applied to quantum processing for data computing.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains without departing from the fundamental characteristics of the present invention. Therefore, the spirit of the present invention should not be limited to the embodiments described above, and the following claims as well as all modified equally or equivalently to the claims should be construed as being intended to fall within the scope and spirit of the invention.

What is claimed is:

1. A quantum computing circuit comprising: a quantum RAM for storing data through a quantum process and providing a search result for a quantum query, wherein the quantum RAM includes:
    a bus qubit corresponding to each bit of first input data;
    a first controlled-bit-flip gate performing controlled-bit-flip transform between the bus qubit and each bit of the first input data;
    a register qubit given to encode the first input data into a probability amplitude value;
    a controlled rotation gate for probability amplitude adjustment of a quantum superposition state given as a tensor product of a bus qubit state and a register qubit state for output of the first controlled-bit-flip gate; and
    a second controlled-bit-flip gate performing controlled-bit-flip transform between a part corresponding a bus qubit of output of the controlled rotation gate and each bit of the first input data.

2. The quantum computing circuit of claim 1, wherein a predetermined quantum superposition state corresponding to a plurality of queries as input of the bus qubit is received to produce a quantum database for the quantum superposition state.

3. The quantum computing circuit of claim 1, wherein the quantum RAM, in order to calculate data in a quantum superposition state with second input data superposed on the first input data, further includes:
    a third controlled-bit-flip gate performing controlled-bit-flip transform between output of the second controlled-bit-flip gate and each bit of the second input data;
    a second controlled rotation gate for probability amplitude adjustment of a quantum superposition state given as a tensor product of a bus qubit state and a register qubit state for output of the third controlled-bit-flip gate; and
    a fourth controlled-bit-flip gate performing controlled-bit-flip transform between a part corresponding to a bus qubit of output of the second controlled rotation gate and each bit of the second input data.

4. The quantum computing circuit of claim 1, wherein the controlled rotation gate includes a single qubit unitary gate conditionally adjusting the state of the register qubit corresponding to a target qubit of a tensor product state having all control qubits that are in a |1⟩ state.

5. The quantum computing circuit of claim 4, wherein the single qubit unitary gate is a rotation gate rotated by a predetermined angle about a predetermined axis on the Bloch sphere.

6. The quantum computing circuit of claim 1, wherein the controlled rotation gate performs rotation corresponding to complex probability amplitude information on the Bloch sphere.

7. The quantum computing circuit of claim 1, further comprising a gate to which rotation computing is applied before or after the first controlled-bit-flip gate and the second controlled-bit-flip gate to process input of the first input data and a normalized generation frequency or normalized occurrence of data.

8. The quantum computing circuit of claim 1, wherein two or more register qubits in a |0⟩ state are used other than bus qubits from 0 to n−1 corresponding to bits of the first input data to independently compute two or more sets of data, and
    a first computing architecture including the first controlled-bit-flip gate, the controlled rotation gate, and the second controlled-bit-flip gate, and at least one computing architectures arranged in series in the same architecture as the first computing architecture perform probability amplitude adjustment using register qubits in the controlled rotation gate, respectively, thereby processing independently separate computation for input data of the computing architectures.

9. A quantum computing circuit comprising: a quantum RAM for storing data through a quantum process and providing a search result for a quantum query, wherein the quantum RAM includes:
    a bus qubit corresponding to each bit of first input data;
    a first controlled-bit-flip gate performing controlled-bit-flip transform between the bus qubit and each bit of the first input data;
    a register qubit given to encode the first input data into a probability amplitude value;
    a first controlled rotation gate for probability amplitude adjustment of a quantum superposition state given by a tensor product of a bus qubit state and a register qubit state for output of the first controlled-bit-flip gate;
    a second controlled rotation gate for probability amplitude adjustment of a quantum superposition state given as tensor product of a bus qubit state and a register qubit state for output of the first controlled-bit-flip gate; and
    a second controlled-bit-flip gate performing controlled-bit-flip transform between a part corresponding a bus qubit of output of the second controlled rotation gate and each bit of second input data.

* * * * *

UNITED STATES PATENT AND TRADEMARK OFFICE
CERTIFICATE OF CORRECTION

PATENT NO.         : 10,824,373 B2
APPLICATION NO.    : 16/412692
DATED              : November 3, 2020
INVENTOR(S)        : June-Koo Rhee et al.

Page 1 of 1

It is certified that error appears in the above-identified patent and that said Letters Patent is hereby corrected as shown below:

In the Claims

Column 10, Line 10, Claim 4, delete "II)" and insert -- |1 > --

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*